(12) United States Patent
Ikarashi

(10) Patent No.: US 11,099,984 B2
(45) Date of Patent: Aug. 24, 2021

(54) PERMUTATION APPARATUS, PERMUTATION METHOD, AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/652,113

(22) PCT Filed: Oct. 2, 2018

(86) PCT No.: PCT/JP2018/036838
§ 371 (c)(1),
(2) Date: Mar. 30, 2020

(87) PCT Pub. No.: WO2019/073858
PCT Pub. Date: Apr. 18, 2019

(65) Prior Publication Data
US 2020/0310970 A1    Oct. 1, 2020

(30) Foreign Application Priority Data

Oct. 12, 2017 (JP) .............................. JP2017-198385

(51) Int. Cl.
*G06F 12/0802* (2016.01)
*G06F 12/109* (2016.01)

(52) U.S. Cl.
CPC ........ *G06F 12/0802* (2013.01); *G06F 12/109* (2013.01); *G06F 2212/462* (2013.01)

(58) Field of Classification Search
CPC ............... G06F 12/0802; G06F 12/109; G06F 2212/462; G09C 1/00
See application file for complete search history.

(56) References Cited

U.S. PATENT DOCUMENTS 5,937,403 A * 8/1999 Saito ........................ G06F 7/76
711/200

FOREIGN PATENT DOCUMENTS

AU    2007254663 A1    7/2009

OTHER PUBLICATIONS

International Search Report dated Jan. 8, 2019 in PCT/JP2018/036838 filed on Oct. 2, 2018, 2 pages.

(Continued)

*Primary Examiner* — Aracelis Ruiz
(74) *Attorney, Agent, or Firm* — Oblon, McClelland, Maier & Neustadt, L.L.P.

(57) ABSTRACT

To perform permutation processing at high speed. A number-of-elements determination unit (22) calculates the number of elements to be contained in each allocation destination. A start position determination unit (23) calculates a start position corresponding to each allocation destination. An allocation destination determination unit (24) calculates a sequence of values representing allocation destinations in a buffer. A permutation generating unit (25) calculates a sequence of values representing permutation destinations within the respective allocation destination. An initial position setting unit (31) sets the start position into a value indicating a position within processing corresponding to each allocation destination. A rearrangement unit (32) sets the elements of a vector into the respective allocation destinations in the buffer. A permutation execution unit (33) generates an output vector by executing an arbitrary inverse permutation algorithm on the respective allocation destinations.

7 Claims, 10 Drawing Sheets

(56) References Cited

OTHER PUBLICATIONS

Ikarashi, D. et al., "A Design and an Implementation of Super-high-speed Multi-party Sorting: The Day When Multi-party Computation Reaches Scripting Languages," Computer Security Symposium, Oct. 2017, pp. 600-607, 9 total pages (with English Abstract).

Fisher, R. A. et al., "Statistical Tables for Biological, Agricultural and Medical Research," Oliver and Boyd, 1938, pp. 1-146, 155 total pages.

Granlund, T. et al., "Division by Invariant Integers using Multiplication," PLDI, 1994, pp. 61-72.

"Fisher—Yates shuffle", Wikipedia, Apr. 30, 2019, 19:22, pp. 1-11.

\* cited by examiner

PERMUTATION APPARATUS, PERMUTATION METHOD, AND PROGRAM

TECHNICAL FIELD

The present invention relates to a technique for performing permutation processing at high speed.

BACKGROUND ART

Permutation is one of basic data processing techniques used in a computer and the like and has found applications in various settings. Conventional permutation techniques include obvious permutation which moves data in sequence to locations described in permutation information and Fisher-Yates algorithm for randomly shuffling an array (see Non-patent Literature 1, for instance).

PRIOR ART LITERATURE

Non-Patent Literature

Non-patent Literature 1: Fisher, Ronald A., Yates, Frank, "Statistical tables for biological, agricultural and medical research", Oliver & Boyd, pp. 26-27, 1938.

SUMMARY OF THE INVENTION

Problems to be Solved by the Invention

In the conventional permutation techniques, IO accesses take place as random accesses when performing permutation processing. In addition, accesses to a non-cache memory occur when target data is larger than a cache memory. Typically, an access speed differs by an order of magnitude or more between a cache memory and a non-cache memory and by an order of magnitude or more between sequential access and random access. Thus, when the target data is large, the conventional permutation techniques have the problem in that random accesses to a non-cache memory occur and it slows the processing.

In view of the foregoing, an object of the invention is to provide a permutation technique capable of performing permutation processing at higher speed than the conventional techniques.

Means to Solve the Problems

To solve the above-described problem, a first aspect of the present invention provides a permutation apparatus, where D is a predetermined number of segmentations, $\vec{a}$ is a vector of length m, $\vec{b}$ is a sequence of values less than D representing allocation destinations in a buffer, $\vec{x}$ is a sequence of values representing permutation destinations within the respective allocation destinations, $\vec{d}$ is a vector representing a buffer of length m, i is each integer equal to or greater than 0 and less than D, j is each integer equal to or greater than 0 and less than m, $S_i$ is a start position corresponding to an i-th allocation destination, and $N_i$ is the number of elements to be contained in the i-th allocation destination. The permutation apparatus includes: an initial position setting unit that, for each integer i, sets the start position $S_i$ into a value $P_i$ indicating a position within processing corresponding to the i-th allocation destination; a rearrangement unit that, for each integer j, sets a j-th element $a_j$ of the vector $\vec{a}$ into a $P_{b\_j}$-th element $d_{P\_b\_j}$ in the buffer $\vec{d}$; and a permutation execution unit that, for each integer i, generates $N_i$ elements $c_{S\_i}, \ldots, c_{S\_i+N\_i-1}$ starting at an $S_i$-th element of an output vector $\vec{c}$ by executing an arbitrary inverse permutation algorithm on $N_i$ elements $d_{S\_i}, \ldots, d_{S\_i+N\_i-1}$ starting at an $S_i$-th element in the buffer $\vec{d}$ using $N_i$ elements starting at an $S_i$-th element of the sequence $\vec{x}$.

To attain the object, a second aspect of the present invention provides a permutation apparatus, where D is a predetermined number of segmentations, $\vec{a}$ is a vector of length m, $\vec{b}$ is a sequence of values less than D representing allocation destinations in a buffer, $\vec{x}$ is a sequence of values representing permutation destinations within the respective allocation destinations, $\vec{d}$ is a vector representing a buffer of length m, i is each integer equal to or greater than 0 and less than D, j is each integer equal to or greater than 0 and less than m, $S_i$ is a start position corresponding to an i-th allocation destination, and $N_i$ is the number of elements to be contained in the i-th allocation destination. The permutation apparatus includes: a permutation execution unit that, for each integer i, sets $N_i$ elements $d_{S\_i}, \ldots, d_{S\_i+N\_i-1}$ starting at an $S_i$-th element in the buffer $\vec{d}$ by executing an arbitrary permutation algorithm on $N_i$ elements starting at an $S_i$-th element of the vector $\vec{a}$ using N elements starting at an $S_i$-th element of the sequence $\vec{x}$; an initial position setting unit that, for each integer i, sets the start position $S_i$ into a value $P_i$ indicating a position within processing corresponding to the i-th allocation destination; and a rearrangement unit that, for each integer j, sets a $P_{b\_j}$-th element $d_{P\_b\_j}$ in the buffer $\vec{d}$ into a j-th element $c_j$ of an output vector $\vec{c}$.

Effects of the Invention

The present invention can perform permutation process at higher speed than the conventional techniques because it can reduce random accesses to a non-cache memory by previously performing processing for allocating permutation target data across buffers that fit in a cache.

DETAILED DESCRIPTION OF THE EMBODIMENTS

Figure 1:
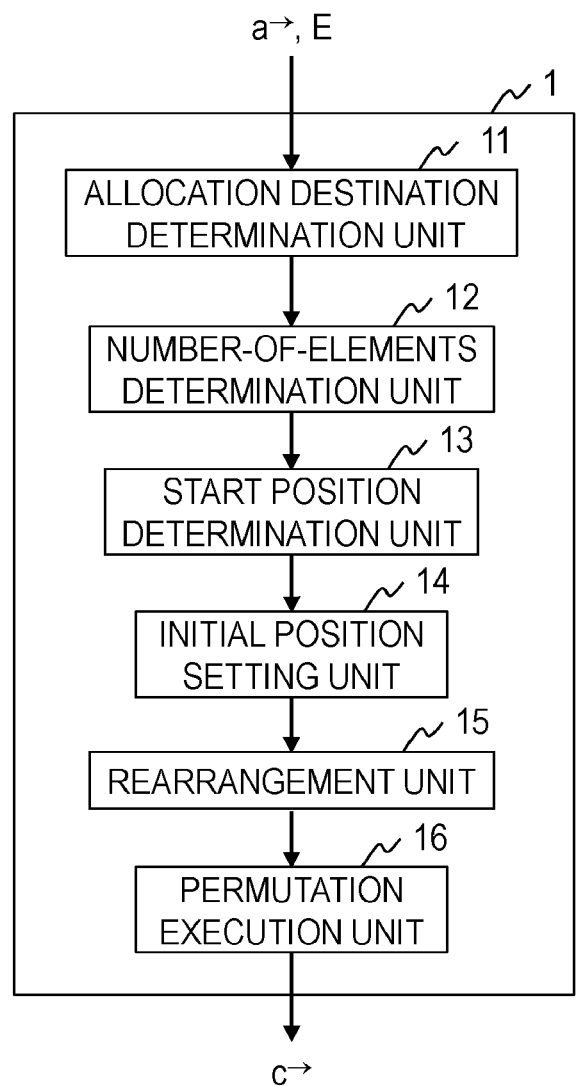
FIG. 1 illustrates a functional configuration of a permutation apparatus according to a first embodiment.

"$\vec{x}$" used herein represents vector x or sequence x. A subscript attached to the letter immediately preceding "$\vec{\phantom{x}}$"

represents an element number within the vector or sequence. For example, "$x_i$" represents the i-th element of vector $\vec{x}$.

The symbol "_" used in a subscript means that the immediately following letters are subscripts. For example, $A_{b\_c}$ means that $b_c$ is attached to A as a subscript. Likewise, $A_{B\_c\_d}$ means that $B_{c\_d}$ is attached to A as a subscript.

When permuting m ($\geq 2$) pieces of data, a permutation technique of the present invention executes processing for coarsely allocating the data into D ($\geq 2$) buffers that fit in a cache, E ($\geq 1$) times (this is sequential access processing to a non-cache memory), and switches to general permutation involving random accesses when a cache hit ratio with m/$D^E$ pieces of data has become sufficiently high (this is random access processing to the cache memory), thereby reducing random accesses to the non-cache memory, which is slow, to achieve high speed permutation. Hereinafter, D is referred to as the number of segmentations and E is referred to as recursion depth.

"D buffers that fit in a cache" does not mean that the size of each one of the D buffers is equal to or less than the size of the cache memory. When a program accesses a certain storage area, a caching mechanism stores data around the area into the cache. Assuming that the unit to store is X and the cache size is C, the cache will always hit if the number of locations to be accessed is limited to about C/X. Also, if sequential access is made at each of the D locations, a cache miss only occurs when sequential access to a location ends up in an area that has not been cached, in which case the speed will be the same as that of a general sequential access. Accordingly, it is desirable that D is a value on the order of C/X.

As mentioned above, the speed differs by an order of magnitude or more between a cache memory and a non-cache memory and by an order of magnitude or more between sequential access and random access. Thus, the present invention, which performs several sequential accesses to a non-cache memory and one random access to a cache memory, is faster than a conventional technique which performs one random access to a non-cache memory. For example, when there are a million pieces of 4-byte data and the cache memory is 256 kilobytes and the unit to store in the cache is 16 kilobytes, the data size will be 4 megabytes and the cache hit ratio will be around 8%. By contrast, when permutation of the present invention is performed with the number of segmentations D of 16 and the recursion depth E of 1, the data can be segmented into 16 portions each having 256 kilobytes through processing equivalent to a single sequential access, and the remaining processing can be random accesses with a cache hit ratio of nearly 100%. In this manner, random accesses to a non-cache memory, which is slowest, can be avoided.

An algorithm for performing random permutation with the method of the present invention is shown below (Scheme 1). Since segmentation is performed randomly, the size of each portion of the segmented buffer is indefinite. If the value of m is sufficiently large, however, the size of each portion will be around m/D with a very high probability. Also, m is assumed to be large in the first place because the present invention is applied when data does not fit in the cache.

The recursion depth E is defined depending on the magnitude of the number of data m. It is set to E=1 when the size of each portion of the buffer (about m/D in the above example) is a magnitude that fits in the cache. If the size of each portion of the buffer does not fit in the cache, it is set to E$\geq$2 and the algorithm can be recursively executed on the data in each portion until the size has become small enough to fit in the cache.

Scheme 1 Random Permutation Algorithm

Input: vector $\vec{a}$ of length m and the recursion depth E ($\geq 1$)

Parameter: the number of segmentations D ($\geq 2$)

Output: uniformly randomly permuted $\pi \vec{a}$

1: generate random permutation

2: generate m random numbers $b_0, b_1, \ldots, b_{m-1}$ less than D and set $\vec{b}:=(b_0, b_1, \ldots, b_{m-1})$.

3: in $\vec{b}$ and for each i<D, count the number of occurrences of i, which is then set as $N_i$.

4: perform permutation

5: for each i<D, set $S_i=P_i:=P_i:=\Sigma_{j<i}N_j$, where $S_0=P_0:=0$.

6: for j=0 to m−1

7: set $d_{P\_b\_j}:=a_j$.

8: set $P_{b\_j}:=P_{b\_j}+1$.

9: for i=0 to D−1

10: with $d_{S\_i}, \ldots, d_{S\_i+N\_i-1}$ as an input vector, if E$\geq$2, execute Scheme 1 recursively with a recursion depth of E−1. If E=1, execute an arbitrary random permutation algorithm and output the resulting vector $c_{S\_i}, \ldots, c_{S\_i+N\_i-1}$ after permutation.

The present invention is also applicable to non-random permutation. In that case, using the algorithm shown below (Scheme 2), a general permutation that has been given in conformance to the processing procedure of the present invention is converted in format into a sequence of values representing allocation destinations and a sequence of values representing permutation destinations within the allocation destinations.

Scheme 2 Format Conversion Algorithm for Conversion from General Permutation

Input: a general permutation $\vec{\pi}$

Output: a sequence $\vec{b}$ of values less than D representing allocation destinations and a sequence $\vec{x}$ of values representing permutation destinations within the allocation destinations 1: q:=m/D 2: r:=m mod D 3: for each i<D, set $S_i=P_i:=iq+\min(r, i)$.

4: for j=0 to m−1

5: set the quotient of $\pi_j$ divided by q as k' and the remainder as s.

6: set $b_j:=k'-(s<\min(r, k')?1:0)$.

7: set $x_{P\_b\_j}:=\pi_j-S_j$.

8: make an update as $P_{b\_j}:=P_{b\_j}+1$.

Here, "?1:0" is an operator that is 1 when the immediately preceding proposition is true and 0 when it is false.

The determination of the quotient k' and the remainder s in Scheme 2 would be slow if they are calculated directly by division. Thus, it is desirable to employ a way of converting a division to a multiplication by making use of the fact that q is fixed during iteration. For example, M is set as a power of 2 with a certain digit or more, the smallest p that satisfies qp$\geq$M is calculated, and $\pi_j \div q$ is calculated with $\pi_j p \gg M$ ($\gg$ representing a shift operation). Because qp$\approx$M, p is almost the inverse M of q. A way of converting a division to a multiplication is described in Reference Literature 1 below, for example.

[Reference Literature 1] Torbjorn Granlund, Peter L. Montgomery, "Division by invariant integers using multiplication", PLDI 1994, pp. 61-72.

Application of the Scheme 2 described above results in output of a sequence $\vec{b}$ of values representing allocation destinations for evenly allocating the length m across D locations and a sequence $\vec{x}$ of values representing permutation destinations within the respective allocation destinations. To "evenly allocate the length m across D locations"

means, when m=80 and D=16, for example, segmenting the length m into portions each containing five elements and moving the value with, for example, a permutation destination of "6" among them to the first one of the 16 locations, that is, the fifth to ninth portions as a whole, in the order of occurrence. Herein, the orders all start at 0.

Schemes 3 and 4 described below use $N_i$ and $S_i$; when Scheme 2 is performed in combination with Scheme 3 or 4, $N_i$ and $S_i$ may be set as follows.

The number of elements in each i-th portion: $N_i=q+(i<r?1:0)$

The start position of each i-th portion: $S_i=iq+\min(r, i)$

Although this method is applicable when m≥256, this does not matter because it is on the assumption that m is a significantly large value as mentioned above. Proof that $N_i$ and $S_i$ are determined as shown above is described later.

For example, in Scheme 1 with E=1, when a sequence $\vec{b}$ of values representing allocation destinations that were generated in Scheme 2 is used in place of the random permutation $\vec{b}$ which is generated in Step 1 of Scheme 1 and further inverse permutation is performed with $N_i$ elements starting at the $S_i$-th element being permutations in the i-th permutation at Step 10 of Scheme 1, the result is the same as when inverse permutation is performed regarding $\vec{a}$ as permutation. Since $N_i$ elements starting at the $S_i$-th element of $\vec{x}$ are permutations for each i, permutations corresponding to Scheme 1 with E≥2 can be generated by performing Scheme 2 recursively. It should be noted that since a permutation is a general permutation when it is in a format that describes positions in the input from which values are to be obtained, combination of Scheme 2 and Scheme 1 provides an inverse permutation being an inverse mapping.

Specifically, an algorithm that performs inverse permutation using the output of Scheme 2 when E=1 is shown below (Scheme 3). When E≥2, the arbitrary inverse permutation algorithm executed at Step 7 of Scheme 3 may be recursively processed on Scheme 3 itself Scheme 3 Inverse Permutation Algorithm Input: vector $\vec{a}$ of length m, a sequence $\vec{b}$ of values less than D representing allocation destinations, a sequence $\vec{x}$ of values representing permutation destinations within the allocation destinations, and the recursion depth E (≥1)

Parameter: the number of segmentations D (≥2)

Output: sequence $\vec{c}$ generated by inverse permutation of $\vec{a}$ with $\vec{b}$, 1: secure buffer $\vec{d}$ of length m.
2: for each i<D, set $P_i:=S_i$.

If the input $\vec{b}$, $\vec{x}$ were generated with Scheme 1, $S_i:=\sum_{j<i} N_j$ may be calculated. Here, for $N_i$, one that was generated in Scheme 1 may be stored.

If the input $\vec{b}$, $\vec{x}$ were generated with Scheme 2, $S_i:=iq+\min(r, i)$ may be calculated. Here, q and r may be calculated with q:=m/D and r:=m mod D, respectively.

3: for j=0 to m−1
4: set $d_{P\_b\_j}:=a_j$.
5: set $P_{b\_j}:=P_{b\_j}+1$.
6: for i=0 to D−1
7: with $d_{S\_i}, \ldots, d_{S\_i+N\_i-1}$ as an input vector, if E≥2, execute Scheme 3 recursively with a recursion depth of E−1. When E=1, execute an arbitrary inverse permutation algorithm and output the resulting vector $c_{S\_i}, \ldots, c_{S\_i+N\_i-1}$ after permutation.

Iterations of Steps 6 and 7 can be processed in parallel.

Specifically, an algorithm that performs permutation using the output of Scheme 2 when E=1 is shown below (Scheme 4). When E≥2, the arbitrary permutation algorithm executed at Step 3 of Scheme 4 may be recursively processed on Scheme 4 itself, as in Scheme 3.

Scheme 4 Permutation Algorithm

Input: vector $\vec{a}$ of length m, a sequence $\vec{b}$ of values less than D representing allocation destinations, a sequence $\vec{x}$ of values representing permutation destinations within the allocation destinations, and the recursion depth E (≥1)

Parameter: the number of segmentations D (≥2)

Output: sequence $\vec{c}$ generated by permutation of $\vec{a}$ with $\vec{b}$, 1: secure buffer $\vec{d}$ of length m.
2: for i=0 to D−1
3: with $a_{S\_i}, \ldots, a_{S\_i+N\_i-1}$ and $x_{S\_i}, \ldots, x_{S\_i+N\_i-1}$ as input vectors, if E≥2, execute Scheme 4 recursively with a recursion depth of E−1. When E=1, execute an arbitrary permutation algorithm and output the resulting vector $d_{S\_i}, \ldots, d_{S\_i+N\_i-1}$ after permutation.

If the input $\vec{b}$, $\vec{x}$ were generated with Scheme 1, the $N_i$ that was generated in Scheme 1 may be stored and $S_i:=\sum_{j<i} N_j$ may be calculated.

If the input $\vec{b}$, $\vec{x}$ were generated with Scheme 2, $S_i:=iq+\min(r, i)$ and $N_i=q+(i<r?1:0)$ may be calculated. Here, q and r may be calculated with q:=m/D and r:=m mod D, respectively.

4: for each i<D, set $P_i:=S_i$.
5: for j=0 to m−1
6: set $c_j:=d_{P\_b\_j}$.
7: set $P_{b\_j}:=P_{b\_j}+1$.

Iterations of Steps 2 and 3 can be processed in parallel. By contrast, iterations of Steps 5 to 7 cannot be processed in parallel.

<Proof>

Proof that $N_i$ and $S_i$ are the aforementioned values when Scheme 2 and Scheme 3 or 4 are executed in combination is shown below.

A necessary and sufficient condition for an element at a certain destination j=k'q+s to be stored in the k-th buffer is as follows in terms of definition of processing.

$$(k'=k \wedge s \geq \min(r,k')) \vee (k'=k+1 \wedge s < \min(r,k'))$$

Since k'=k and k'=k+1 are exclusive, the left member and the right member separated by $\vee$ are exclusive, and the number of elements to be stored in the k-th buffer is the sum of the number of j's that satisfy the left member and the number of j's that satisfy the right member.

Consider the left member. When considering j that satisfies k'=k, min(r, k')=min(r, k) because k'=k. When k≥r, min(r, k)=r and s≥min(r, k)⇔s≥r. When k<r, similarly s≥k and the left member is equivalent to:

$$k'=k \wedge ((k \geq r \wedge s \geq r) \vee (k < r \wedge s \geq k)).$$

When considering the right member, it is similarly equivalent to $$k'=k+1 \wedge ((k \geq r \wedge s < r) \vee (k < r \wedge s < k+1)).$$

When k≥r upon summation, then $$(k'=k \wedge s \geq r) \vee (k'=k+1 \wedge S < r), \text{ and}$$

when k<r, then $$(k'=k \wedge s \geq k) \vee (k'=k+1 \wedge S < k+1).$$

Here, q≥16 when m≥256.

(i) When m is not a multiple of 16, k'≤16 and j's that satisfy k'=16 are: j=16q, 16q+1, 16q+r−1 (note that r>0 because m is not a multiple of 16).

The foregoing is based on reduction to absurdity. Given that k'≥17 holds, k'q>16q+r=m due to q≥16, which is contradictory. Given that k'=16 does not hold, m−1≤15q+

(q−1) because the maximum of j is m−1, which is contradictory to m=16q+r. Consequently, k'≤16 and looking at m−1=16q+r−1, j's that satisfy k'=16 are: j=16q, 16q+1, . . . , 16q+r−1.

When k≤15, s assumes all the values 0 to q−1 and the number of j's for which k'=k is q and thus s. Then, the number of j's that satisfy k'=k∧s≥r, is q−r, and the number of j's that satisfy k'=k∧s≥k is q−k.

When k≤14, the number of j's that satisfy k'=k+1∧s<r is r, and the number of j's that satisfy k'=k+1∧s<k+1 is k+1. Thus, with k≤14, the number of j's is q+1 when k<r and is q when k≥r.

When k=15, k≥r always holds, and the number of j's that satisfy k'=k∧s≥r is q−r and j's that satisfy k'=16 are: j=16q, 16q+1, . . . , 16q+r−1. Thus, the number of j's for which s<r is r. Accordingly, the number of j's for which k=15 is q. Then, with k≤15, the number is q+1 when k<r and is q when k r, so that it is equal to q+(k<r?1:0). As the total number of j's for which k ≤15 is 16q+r, the number of j's for which k=16 is 0.

(ii) When m is a multiple of 16, s<min(r, k') is always false because r=0, and k=k' holds. Then, the number of j's across all the buffers from the 0-th to the 15-th is q. Because r is 0, k<r is also always false and q+(k<r?1:0)=q; thus, the proposition is correct.

Embodiments of the present invention are described in detail below. In the drawings, components having the same function are given the same reference numerals and overlapping descriptions are not provided.

First Embodiment

A first embodiment of the present invention is a permutation apparatus and method that execute the random permutation shown in Scheme 1.

A permutation apparatus 1 of the first embodiment includes an allocation destination determination unit 11, a number-of-elements determination unit 12, a start position determination unit 13, an initial position setting unit 14, a rearrangement unit 15, and a permutation execution unit 16, as illustrated in FIG. 1. The permutation apparatus 1 takes, as input, a vector $\vec{a}:=(a_0, a_1, \ldots, a_{m-1})$ of length m and the recursion depth E (≥1) and outputs an output vector $\vec{c}$ generated by uniform random permutation of the vector $\vec{a}$. By the permutation apparatus 1 performing the processing at each of the steps illustrated in FIG. 2, the permutation method of the first embodiment is carried out.

The permutation apparatus 1 is a special device configured by loading of a special program into a well-known or a dedicated computer having a central processing unit (CPU), main storage unit (random access memory: RAM), and the like, for example. The permutation apparatus 1 executes processing under control of the central processing unit, for example. Data input to the permutation apparatus 1 and data resulting from processing are stored in the main storage unit, for example, and the data stored in the main storage unit is read into the central processing unit and utilized for other processing as necessary. The processing components of the permutation apparatus 1 may be at least partially composed of hardware such as an integrated circuit.

Figure 2:
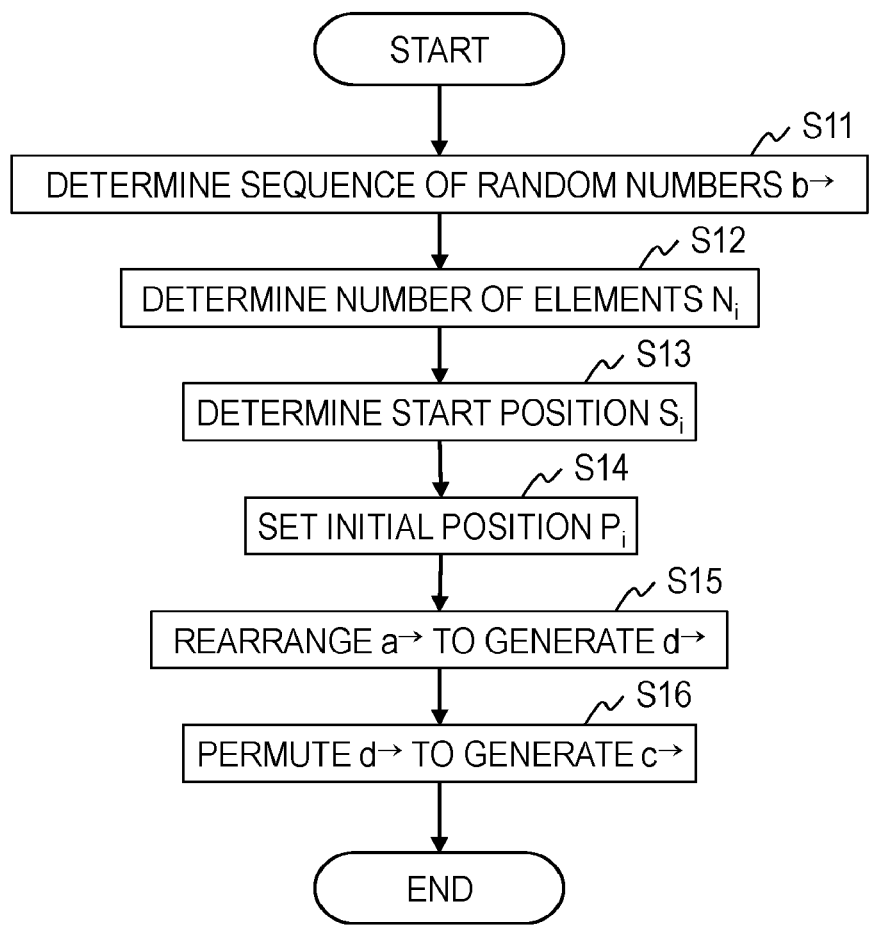
FIG. 2 illustrates a processing procedure of a permutation method according to the first embodiment.

Referring to FIG. 2, the permutation method executed by the permutation apparatus 1 of the first embodiment is described.

At step S11, the allocation destination determination unit 11 generates m random numbers $b_0, b_1, \ldots, b_{m-1}$ less than D, and generates a sequence of random numbers $\vec{b}:=(b_0, b_1, \ldots, b_{m-1})$. The random numbers $b_0, b_1, \ldots, b_{m-1}$ are values representing the allocation destinations for allocating the elements $a_0, a_1, \ldots, a_{m-1}$ of the vector $\vec{a}$ to be permuted in the buffer.

At step S12, for each integer i equal to or greater than 0 and less than D, the number-of-elements determination unit 12 determines the number of elements $N_i$ for the i-th allocation destination by counting the number of occurrences of the integer i in the sequence $\vec{b}$.

At step S13, for each integer i equal to or greater than 0 and less than D, the start position determination unit 13 determines a start position $S_i$ corresponding to the i-th allocation destination by calculating $S_i := \Sigma_{j<i} N_j$. Here, $S_0 := 0$.

At step S14, for each integer i equal to or greater than 0 and less than D, the initial position setting unit 14 sets the start position $S_i$ of the i-th allocation destination into a value $P_i$ indicating the position within processing corresponding to the i-th allocation destination in the buffer. That is, it calculates $P_i := S_i$.

At step S15, the rearrangement unit 15 sets the elements of the vector $\vec{a}$ of length m into the vector $\vec{d} := (d_0, d_1, \ldots, d_{m-1})$ representing the buffer of length m secured in advance, according to the sequence of random numbers $\vec{b}$. Specifically, for each integer j equal to or greater than 0 and less than m, the j-th element $a_j$ of vector $\vec{a}$ is set into the $P_{b_j}$-th element in the buffer $\vec{d}$. That is, $d_{P_{b_j}} := a_j$ is calculated. Thereafter, an update is made as $P_{b_j} := P_{b_j} + 1$.

At step S16, for each integer i equal to or greater than 0 and less than D, when E≥2, the permutation execution unit 16 recursively executes steps S11 to S16 with $N_i$ elements $d_{S_i}, \ldots, d_{S_i+N_i-1}$ starting at the $S_i$-th element of the vector $\vec{d}$ as the input vector and with the recursion depth E set as E−1. When E=1, it executes an arbitrary inverse permutation algorithm on the $N_i$ elements $d_{S_i}, \ldots, d_{S_i+N_i-1}$ starting at the $S_i$-th element of the vector $\vec{d}$, thereby generating $N_i$ elements $c_{S_i}, \ldots, c_{S_i+N_i-1}$ starting at the $S_i$-th element of output vector $\vec{c} := (c_0, c_1, \ldots, c_{m-1})$.

Second Embodiment

A second embodiment of the present invention is a permutation apparatus and method that execute the inverse permutation shown in Scheme 3 using a sequence of values representing allocation destinations in the buffer and a sequence of values representing permutation destinations within the respective allocation destinations, which were generated through the format conversion shown in Scheme 2.

Figure 3:
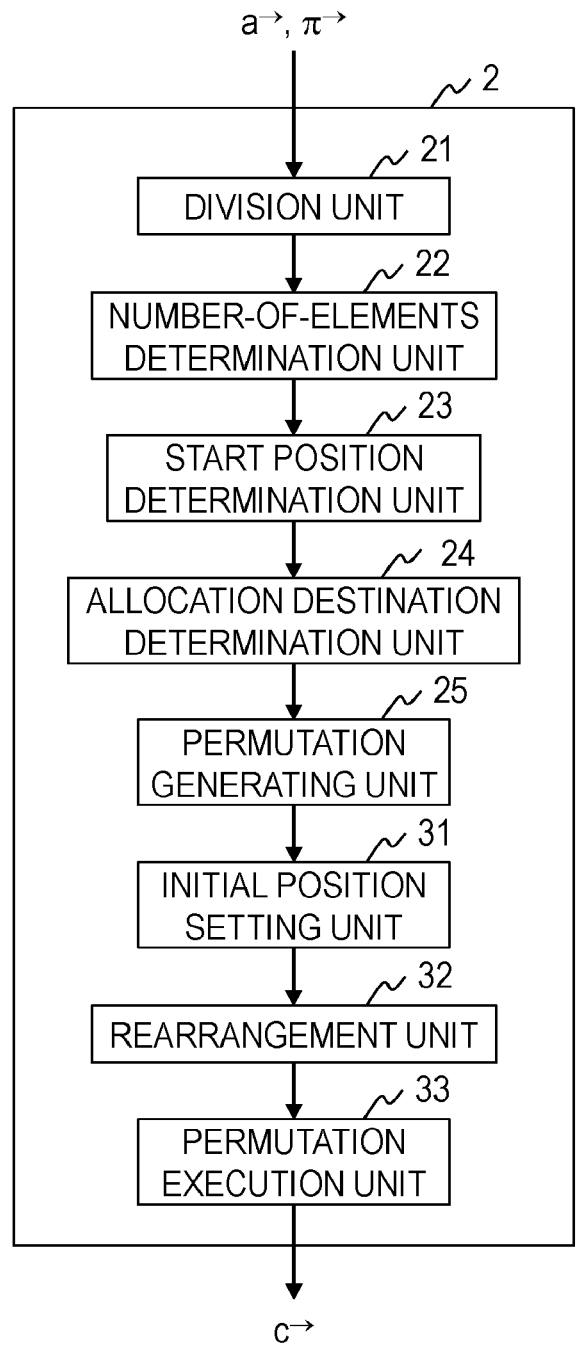
FIG. 3 illustrates a functional configuration of a permutation apparatus according to a second embodiment.

A permutation apparatus 2 of the second embodiment includes a division unit 21, a number-of-elements determination unit 22, a start position determination unit 23, an allocation destination determination unit 24, a permutation generating unit 25, an initial position setting unit 31, a rearrangement unit 32, and a permutation execution unit 33, as illustrated in FIG. 3. The permutation apparatus 2 takes, as input, a vector $\vec{a} := (a_0, a_1, \ldots, a_{m-1})$ of length m and a permutation $\vec{\pi} := (\pi_0, \pi_1, \ldots \pi_{m-1})$ of length m, and outputs a vector $\vec{c} := (c_0, c_1, \ldots, c_{m-1})$ after permutation of the vector $\vec{a}$ according to the permutation $\vec{\pi}$. By the permutation apparatus 2 performing the processing at each of the steps illustrated in FIG. 4, the permutation method of the second embodiment is carried out.

Figure 4:
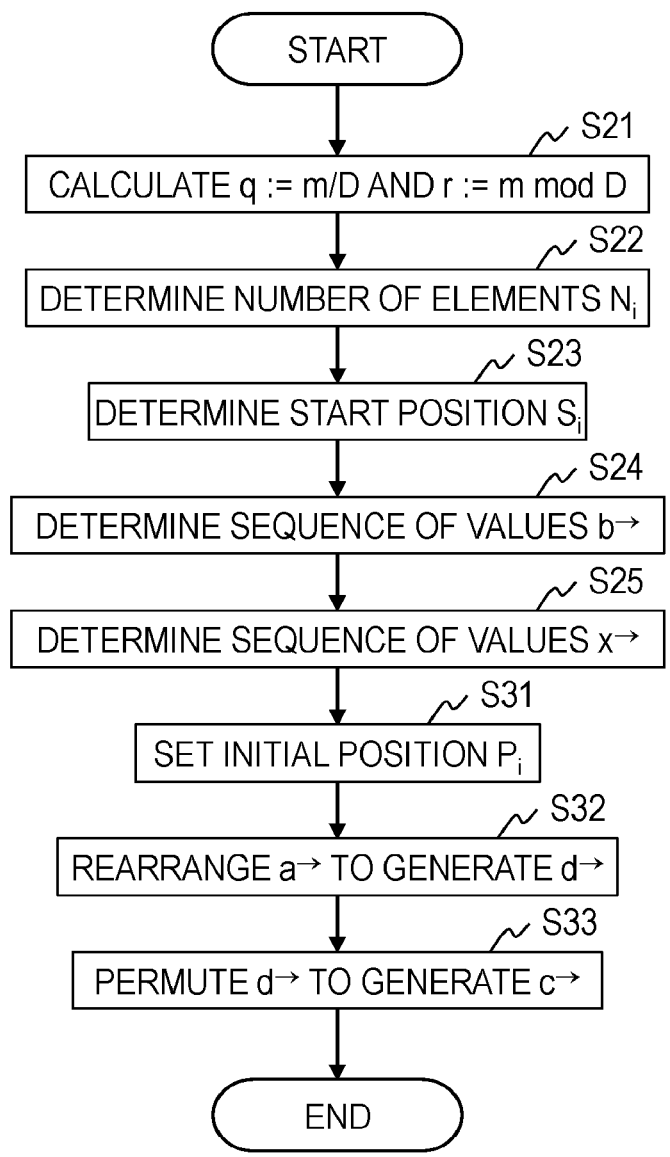
FIG. 4 illustrates a processing procedure of a permutation method according to the second embodiment.

Referring to FIG. 4, the permutation method executed by the permutation apparatus 2 of the second embodiment is described.

At step S21, the division unit 21 calculates q:=m/D and r:=m mod D.

At step S22, for each integer i equal to or greater than 0 and less than D, the number-of-elements determination unit 22 determines the number of elements $N_i$ to be contained in the i-th allocation destination by calculating $N_i:=q+(i<r?1:0)$.

At step S23, for each integer i equal to or greater than 0 and less than D, the start position determination unit 23 determines the start position $S_i$ corresponding to the i-th allocation destination by calculating $S_i:=iq+\min(r, i)$.

At step S24, for each integer j equal to or greater than 0 and less than m, the allocation destination determination unit 24 calculates $b_j:=k'-(s<\min(r, k')?1:0)$, where k' is the quotient of $\pi_j$ divided by q and s is the remainder, and generates a sequence $\vec{b}:=(b_0, b_1, \ldots, b_{m-1})$ of values representing allocation destinations in the buffer.

At step S25, for each integer j equal to or greater than 0 and less than m, the permutation generating unit 25 calculates $x_{P\_b\_j}:=\pi_j-S_j$ and generates a sequence $\vec{x}:=(x_0, x_1, \ldots, x_{m-1})$ of values representing permutation destinations within the respective allocation destinations.

At step S31, for each integer i equal to or greater than 0 and less than D, the initial position setting unit 31 sets the start position $S_i$ of the i-th allocation destination into a value $P_i$ indicating the position within processing corresponding to the i-th allocation destination in the buffer. That is, $P S_i$ is calculated.

At step S32, the rearrangement unit 32 sets the elements of the vector $\vec{a}$ of length m into the vector $\vec{d}:=(d_0, d_1, \ldots, d_{m-1})$ representing the buffer of length m secured in advance according to the sequence of values $\vec{b}$ representing the allocation destinations in the buffer. Specifically, for each integer j equal to or greater than 0 and less than m, the j-th element $a_j$ of the vector $\vec{a}$ is set into the $P_{b\_j}$-th element in the buffer $\vec{d}$. That is, $d_{P\_b\_j}:=a_j$ is set. Thereafter, an update is made as $P_{b\_j}:=P_{b\_j}+1$.

At step S33, for each integer i equal to or greater than 0 and less than D, the permutation execution unit 33 generates $N_i$ elements $c_{S\_i}, \ldots, c_{S\_i+N\_i-1}$ starting at the $S_i$-th element of the output vector $\vec{c}:=(c_0, c_1, \ldots, c_{m-1})$ by executing an arbitrary inverse permutation algorithm on $N_i$ elements $d_{S\_i}, \ldots, d_{S\_i+N\_i-1}$ starting at the $S_i$-th element of the vector $\vec{d}$.

Third Embodiment

A third embodiment of the present invention is a permutation apparatus and method that execute the permutation shown in Scheme 4 using a sequence of values representing the allocation destinations in the buffer and a sequence of values representing permutation destinations within the respective allocation destinations, which were generated through the format conversion shown in Scheme 2.

Figure 5:
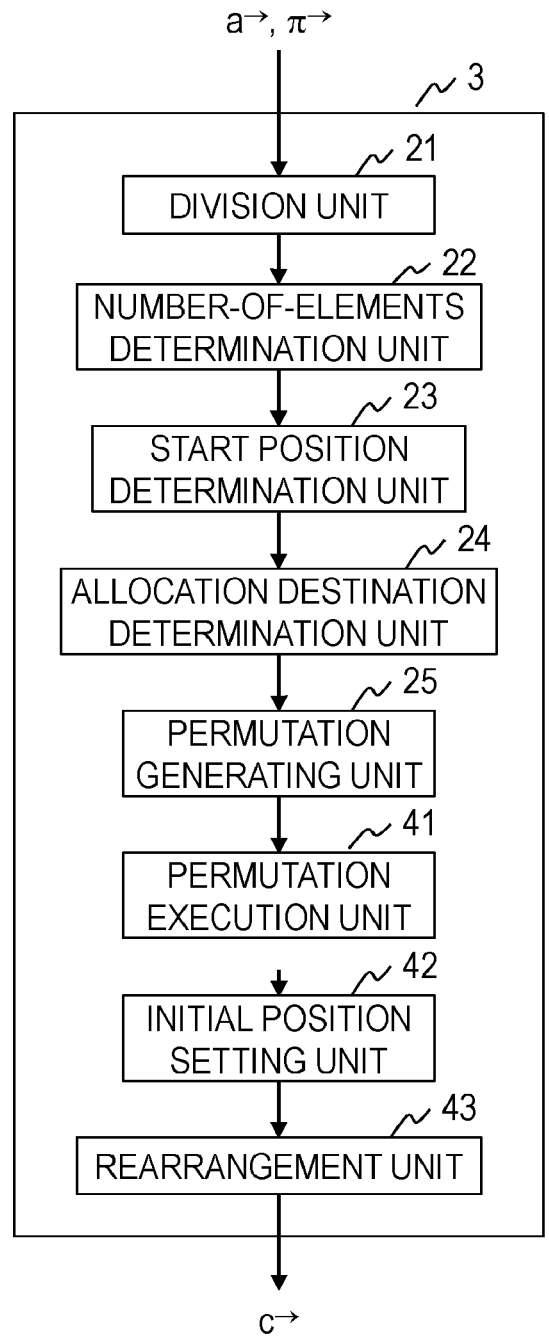
FIG. 5 illustrates a functional configuration of a permutation apparatus according to a third embodiment.

A permutation apparatus 3 of the third embodiment includes a division unit 21, a number-of-elements determination unit 22, a start position determination unit 23, an allocation destination determination unit 24, a permutation generating unit 25, a permutation execution unit 41, an initial position setting unit 42, and a rearrangement unit 43, as illustrated in FIG. 5. The permutation apparatus 3 takes, as input, a vector $\vec{a}:=(a_0, a_1, \ldots, a_{m-1})$ of length in and a permutation $\vec{\pi}:=(\pi_0, \pi_1, \ldots, \pi_{m-1})$ of length m, and outputs a vector $\vec{c}:=(c_0, c_1, \ldots, c_{m-1})$ after permutation of the vector $\vec{a}$ according to the permutation $\vec{\pi}$. By the permutation apparatus 3 performing the processing at each of the steps illustrated in FIG. 6, the permutation method of the third embodiment is carried out.

Figure 6:
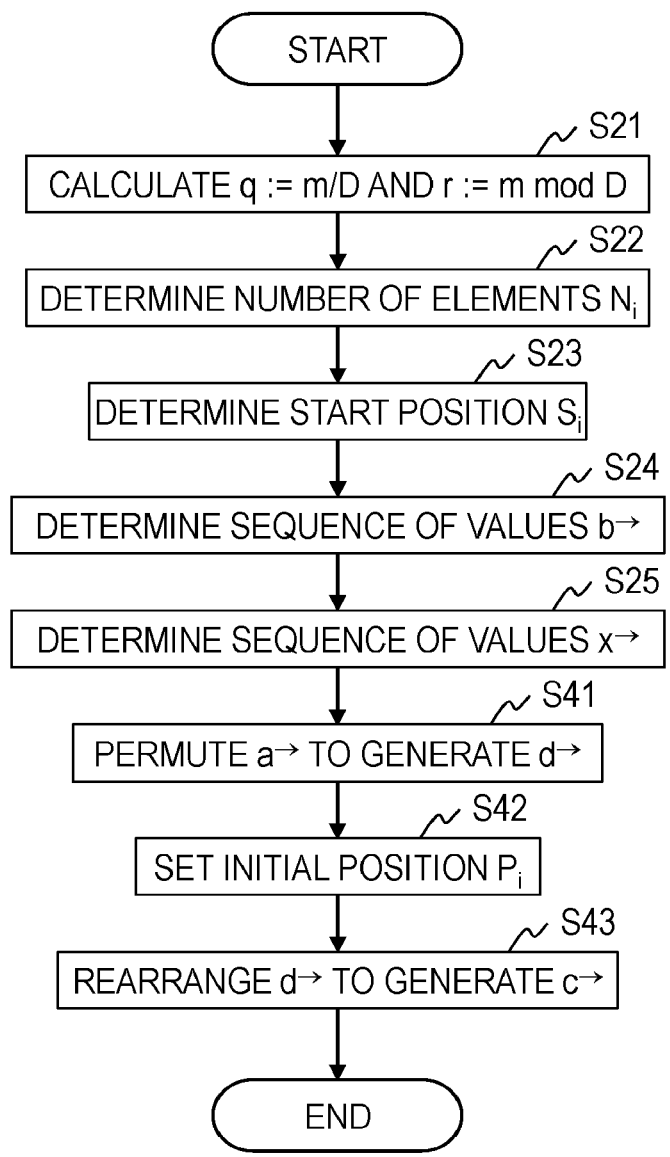
FIG. 6 illustrates a processing procedure of a permutation method according to the third embodiment.

Referring to FIG. 6, the permutation method executed by the permutation apparatus 3 of the third embodiment is described. The following description focuses on differences from the embodiments already described.

Processing at step S21 to step S25 is similar to the second embodiment.

At step S41, for each integer i equal to or greater than 0 and less than D, the permutation execution unit 41 executes an arbitrary permutation algorithm on $N_i$ elements starting at the $S_i$-th element of the vector $\vec{a}$ of length m using $N_i$ elements starting at the $S_i$-th element of a sequence of values $\vec{x}$ representing permutation destinations within the respective allocation destinations, thereby setting $N_i$ elements starting at the $S_i$-th element of the vector $\vec{d}:=(d_0, d_1, \ldots, d_{m-1})$ of length m secured in advance.

At step S42, for each integer i equal to or greater than 0 and less than D, the initial position setting unit 42 sets the start position $S_i$ of the i-th allocation destination into a value $P_i$ indicating the position within processing corresponding to the i-th allocation destination in the buffer. That is, $P_i:=S_i$ is calculated.

At step S43, the rearrangement unit 43 sets the elements of the vector $\vec{d}$ of length m into the output vector $\vec{c}:=(c_0, c_1, \ldots, c_{m-1})$ according to the sequence $\vec{b}$ of values representing the allocation destinations in the buffer. Specifically, for each integer j equal to or greater than 0 and less than m, the $P_{b\_j}$-th element $d_{P\_b\_j}$ in the buffer $\vec{d}$ is set into the j-th element $c_j$ of the output vector $\vec{c}$. That is, $c_j:=d_{P\_b\_j}$ is set. Thereafter, an update is made as $P_{b\_j}:=P_{b\_j}+1$.

Fourth Embodiment

A fourth embodiment of the present invention is a permutation apparatus and method that handle two random permutations ($\vec{b}$, $\vec{x}$) generated by Scheme 1 as a sequence of values representing allocation destinations in a buffer and a sequence of values representing permutation destinations within the respective allocation destinations and execute the inverse permutation shown in Scheme 3.

Figure 7:
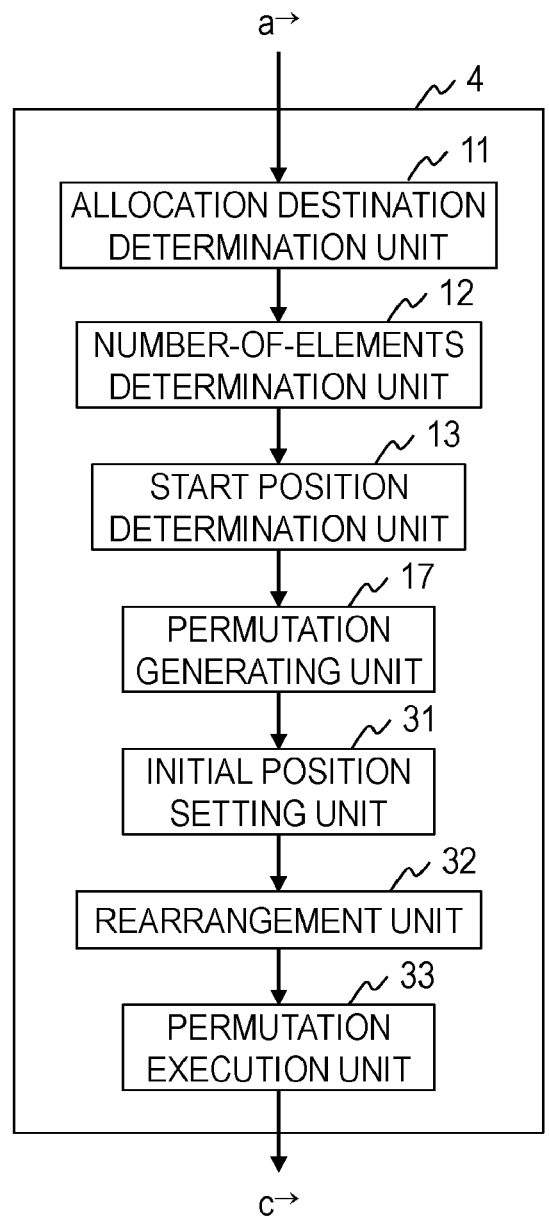
FIG. 7 illustrates a functional configuration of a permutation apparatus according to a fourth embodiment.

A permutation apparatus 4 of the fourth embodiment includes an allocation destination determination unit 11, a number-of-elements determination unit 12, a start position determination unit 13, a permutation generating unit 17, an initial position setting unit 31, a rearrangement unit 32, and a permutation execution unit 33, as illustrated in FIG. 7. The permutation apparatus 4 takes, as input, a vector $\vec{a}:=(a_0, a_1, \ldots, a_{m-1})$ of length m and outputs an output vector $\vec{c}$ generated by uniform random permutation of the vector $\vec{a}$. By the permutation apparatus 4 performing the processing at each of the steps illustrated in FIG. 8, the permutation method of the fourth embodiment is carried out.

Figure 8:
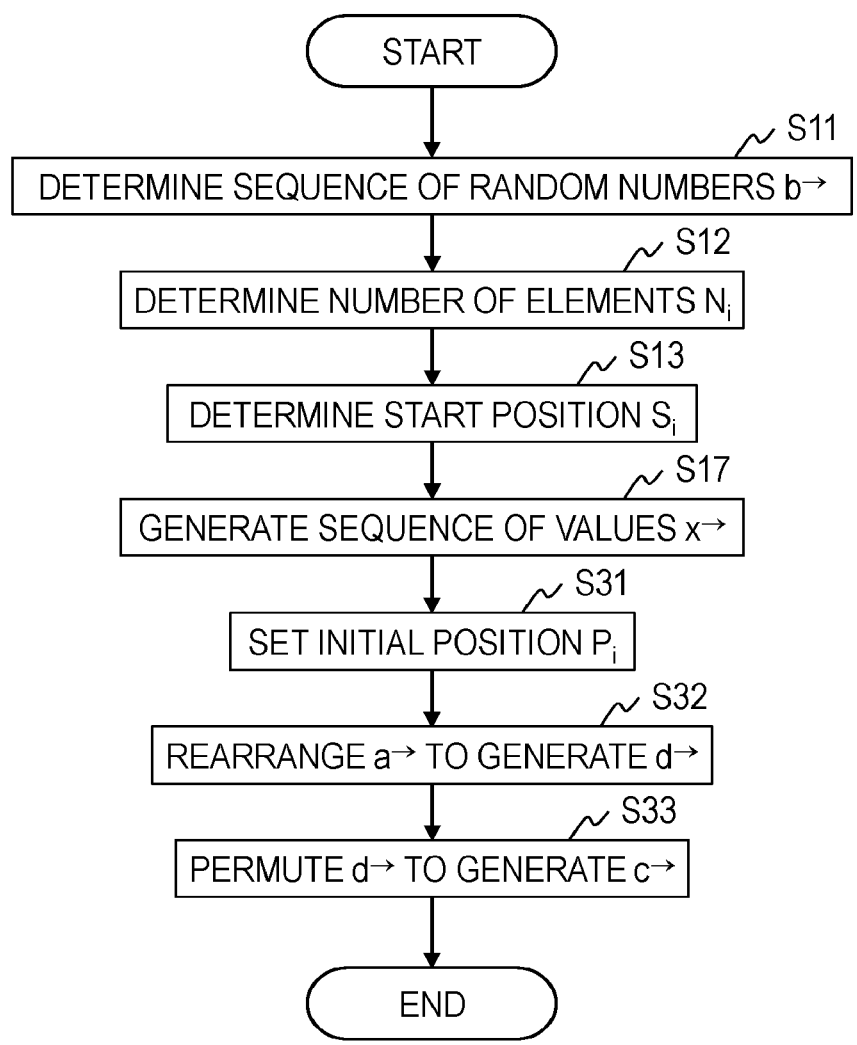
FIG. 8 illustrates a processing procedure of a permutation method according to the fourth embodiment.

Referring to FIG. 8, the permutation method executed by the permutation apparatus 4 of the fourth embodiment is described. The following description focuses on differences from the embodiments already described.

Processing at step S11 to step S13 is similar to the first embodiment.

At step S17, the permutation generating unit 17 generates m permutations $\pi_i$ utilizing an arbitrary inverse permutation algorithm for each integer i equal to or greater than 0 and less than D. A sequence of values generated by concatenating the permutations $\pi_i$ in sequential order is handled as a sequence of values $\vec{x}$ representing permutation destinations within the respective allocation destinations.

Processing at step S31 to step S33 is similar to the second embodiment.

Fifth Embodiment

A fifth embodiment of the present invention is a permutation apparatus and method that handle two random permutations ($\vec{b}$, $\vec{x}$) generated by Scheme 1 as a sequence of values representing allocation destinations in a buffer and a sequence of values representing permutation destinations within the respective allocation destinations and execute the permutation shown in Scheme 4.

Figure 9:
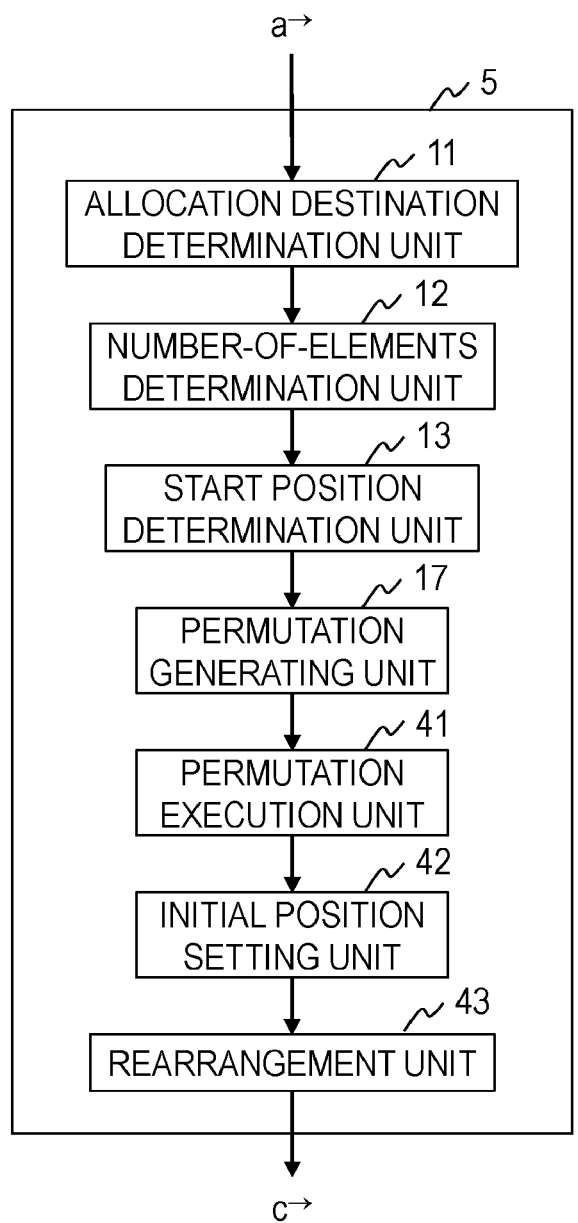
FIG. 9 illustrates a functional configuration of a permutation apparatus according to a fifth embodiment.

A permutation apparatus 5 of the fifth embodiment includes an allocation destination determination unit 11, a number-of-elements determination unit 12, a start position determination unit 13, a permutation generating unit 17, a permutation execution unit 41, an initial position setting unit 42, and a rearrangement unit 43, as illustrated in FIG. 9. The permutation apparatus 5 takes, as input, a vector $\vec{a} := (a_0, a_1, \ldots, a_{m-1})$ of length m and outputs an output vector $\vec{c}$ generated by uniform random permutation of the vector $\vec{a}$. By the permutation apparatus 5 performing the processing at each of the steps illustrated in FIG. 10, the permutation method of the fifth embodiment is carried out.

Figure 10:
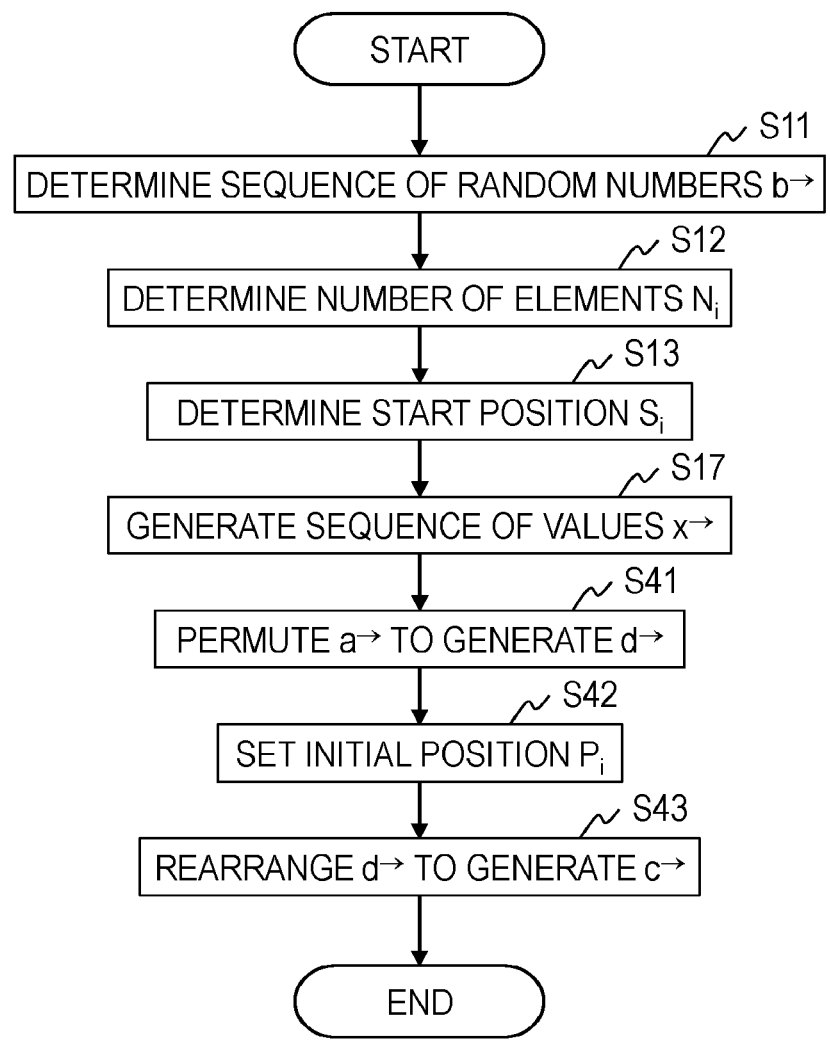
FIG. 10 illustrates a processing procedure of a permutation method according to the fifth embodiment.

Referring to FIG. 10, the permutation method executed by the permutation apparatus 5 of the fifth embodiment is described. The following description focuses on differences from the embodiments already described.

Processing at step S11 to step S13 is similar to the fourth embodiment.

Processing at step S17 is similar to the fourth embodiment.

Processing at step S41 to step S43 is similar to the third embodiment.

Modifications

After random permutation is executed with the permutation apparatus of the first embodiment and some kind of data processing is performed, the random permutation can be undone. In such a case, permutations $\pi_i$ that were generated during the execution of an arbitrary permutation algorithm are concatenated in sequential order to make a sequence $\vec{x}$ of values representing permutation destinations within the respective allocation destinations, and using it with a sequence $\vec{b}$ of values representing allocation destinations in the buffer that was generated when the permutation apparatus of the first embodiment was executed, the processing at steps S31 to S33 shown in the second and the fourth embodiments may be executed. In doing so, the sequence $\vec{b}$ of values representing allocation destinations in the buffer and the sequence $\vec{x}$ of values representing permutation destinations within the allocation destination may be saved in a storage, not shown, in the permutation apparatus and read and utilized as necessary.

The gist of the present invention is as follows. The present invention achieves permutation at high speed by making use of the fact that several sequential accesses and one random access to a cache is faster than random accesses to a non-cache memory despite an increase in the amount of processing and the fact that random accesses to several locations can be done at a similar speed to that of sequential access. In the format conversion (Scheme 2) from a general permutation, the present invention is designed such that elements are evenly allocated via several addition/subtraction and comparison operations, which are categorized as one of the fastest operations on modern computers, aside from one multiplication per element.

Being thus configured, the permutation technique of the present invention provides the following effects. Random accesses to a non-cache memory are reduced to nearly none, enabling permutation and inverse permutation processing at high speed. For example, with a million pieces of 32-bit data, the speed with the conventional obvious permutation or the Fisher-Yates algorithm is around 10 Gbps, whereas the speed with the present invention is around 20 Gbps when E=1 and is around 12 Gbps when E=2. With ten million pieces, the speed with the conventional techniques is around 3 Gbps, whereas the speed with the present invention is around 10 Gbps when E=1 and is around 12 Gbps when E=2. With one hundred million pieces, the speed with the conventional techniques is around 2 Gbps, whereas the speed with the present invention is around 5 Gbps when E=1 and is around 10 Gbps when E=2. While E needs to be increased as the number of data increases in order to eliminate random accesses, the frequency of access itself conversely increases when E is increased; it is understood that there is an optimal value of E depending on the amount of data.

While the embodiments of the present invention have been described, specific configurations are not limited to these embodiments, but design modifications and the like within a range not departing from the spirit of the invention are encompassed in the scope of the invention, of course. The various processes described in the embodiments may be executed in parallel or separately depending on the processing ability of an apparatus executing the process or on any necessity, rather than being executed in time series in accordance with the described order.

[Program and Recording Medium]

When various types of processing functions in the apparatuses described in the above embodiments are implemented on a computer, the contents of processing function to be contained in each apparatus is written by a program. With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present apparatus is configured with a predetermined program executed on a computer. However, the present apparatus may be configured with at least part of these processing contents realized in a hardware manner.

What is claimed is:

1. A permutation apparatus,
where D is a predetermined number of segmentations, $\vec{a}$ is a vector of length m, $\vec{b}$ is a sequence of values less than D representing allocation destinations in a buffer, $\vec{x}$ is a sequence of values representing permutation destinations within each of the allocation destinations, $\vec{d}$ is a vector representing a buffer of length m, i is each integer equal to or greater than 0 and less than D, j is each integer equal to or greater than 0 and less than m, $S_i$ is a start position corresponding to an i-th allocation destination, and $N_i$ is an elements number to be contained in the i-th allocation destination,
the permutation apparatus comprising processing circuitry configured to:
set, for each integer i, the start position $S_i$ into a value $P_i$ indicating a position within processing corresponding to the i-th allocation destination;
set, for each integer j, a j-th element $a_j$ of the vector $\vec{a}$ into a $P_{b\_j}$-th element $d_{P\_b\_j}$ in the buffer $\vec{d}$; and
generate, for each integer i, $N_i$ elements $c_{S\_i}, \ldots, c_{S\_i+N\_i-1}$ starting at an $S_i$-th element of an output vector $\vec{c}$ by executing an arbitrary inverse permutation algorithm on $N_i$ elements $d_{S\_i}, \ldots, d_{S\_i+N\_i-1}$ starting at an $S_i$-th element in the buffer $\vec{d}$ using $N_i$ elements starting at an $S_i$-th element of the sequence $\vec{x}$.

2. A permutation apparatus,
where D is a predetermined number of segmentations, $\vec{a}$ is a vector of length m, $\vec{b}$ is a sequence of values less than D representing allocation destinations in a buffer, $\vec{x}$ is a sequence of values representing permutation destinations within each of the allocation destinations, $\vec{d}$ is a vector representing a buffer of length m, i is each integer equal to or greater than 0 and less than D, j is each integer equal to or greater than 0 and less than m, $S_i$ is a start position corresponding to an i-th allocation destination, and $N_i$ is of an elements number to be contained in the i-th allocation destination,
the permutation apparatus comprising processing circuitry configured to:
set, for each integer i, $N_i$ elements $d_{S\_i}, \ldots, d_{S\_i+N\_i-1}$ starting at an $S_i$-th element in the buffer $\vec{d}$ by executing an arbitrary permutation algorithm on $N_i$ elements starting at an $S_i$-th element of the vector $\vec{a}$ using $N_i$ elements starting at an $S_i$-th element of the sequence $\vec{x}$;
set, for each integer i, the start position $S_i$ into a value $P_i$ indicating a position within processing corresponding to the i-th allocation destination; and
set, for each integer j, a $P_{b\_j}$-th element $d_{P\_b\_j}$ in the buffer $\vec{d}$ into a j-th element $c_j$ of an output vector $\vec{c}$.

3. The permutation apparatus according to claim 1 or 2, the processing circuitry further configured to:
generate m random numbers $b_j$ less than D as the sequence $\vec{b}$;
determine, for each integer i, the elements number $N_i$ by counting an occurrences number of the integer i in the sequence $\vec{b}$;
determine, for each integer i, the start position $S_i$ by calculating $S_i := \Sigma_{j<i} N_j$; and
generate the sequence $\vec{x}$ with an arbitrary random permutation algorithm.

4. The permutation apparatus according to claim 1 or 2, where $\vec{\pi} := (\pi_0, \pi_1, \ldots, \pi_{m-1})$ is a permutation of length m, $q := m/D$, and $r := m \bmod D$,
the processing circuitry further configured to:
determine, for each integer i, the of elements number $N_i$ by calculating $N_i := q + (i < r ? 1 : 0)$;
determine, for each integer i, the start position $S_i$ by calculating $S_i := iq + \min(r, i)$;
generate, for each integer j, the sequence $\vec{b}$ by calculating $b_j := k' - (s < \min(r, k') ? 1 : 0)$, where k' is a quotient of a j-th element $\pi_j$ of the permutation $\vec{\pi}$ divided by q and s is a remainder; and
generate, for each integer j, the sequence $\vec{x}$ by calculating $x_{P\_b\_j} := \pi_j - S_j$.

5. A permutation method,
where D is a predetermined number of segmentations, $\vec{a}$ is a vector of length m, $\vec{b}$ is a sequence of values less than D representing allocation destinations in a buffer, $\vec{x}$ is a sequence of values representing permutation destinations within each of the allocation destinations, $\vec{d}$ is a vector representing a buffer of length m, i is each integer equal to or greater than 0 and less than D, j is each integer equal to or greater than 0 and less than m, $S_i$ is a start position corresponding to an i-th allocation destination, and $N_i$ is an elements number to be contained in the i-th allocation destination,
the permutation method comprising:
setting, for each integer i, the start position $S_i$ into a value $P_i$ indicating a position within processing corresponding to the i-th allocation destination;
setting, for each integer j, a j-th element $a_j$ of the vector $\vec{a}$ into a $P_{b\_j}$-th element $d_{P\_b\_j}$ in the buffer $\vec{d}$; and
generating, for each integer i, $N_i$ elements $c_{S\_i}, \ldots, c_{S\_i+N\_i-1}$ starting at an $S_i$-th element of an output vector $\vec{c}$ by executing an arbitrary inverse permutation algorithm on $N_i$ elements $d_{S\_i}, \ldots, d_{S\_i+N\_i-1}$ starting at an $S_i$th element in the buffer $\vec{d}$ using $N_i$ elements starting at an $S_i$-th element of the sequence $\vec{x}$.

6. A permutation method,
where D is a predetermined number of segmentations, $\vec{a}$ is a vector of length m, $\vec{b}$ is a sequence of values less than D representing allocation destinations in a buffer, $\vec{x}$ is a sequence of values representing permutation destinations within each of the allocation destinations, $\vec{d}$ is a vector representing a buffer of length m, i is each integer equal to or greater than 0 and less than D, j is each integer equal to or greater than 0 and less than m, $S_i$ is a start position corresponding to an i-th allocation destination, and $N_i$ is an elements number to be contained in the i-th allocation destination,
the permutation method comprising:
setting, for each integer i, $N_i$ elements $d_{S\_i}, \ldots, d_{S\_i+N\_i-1}$ starting at an $S_i$-th element in the buffer $\vec{d}$ by executing an arbitrary permutation algorithm on $N_i$ elements starting at an $S_i$-th element of the vector $\vec{a}$ using $N_i$ elements starting at an $S_i$-th element of the sequence $\vec{x}$;
setting, for each integer i, the start position $S_i$ into a value $P_i$ indicating a position within processing corresponding to the i-th allocation destination; and
setting, for each integer j, a $P_{b\_j}$-th element $d_{P\_b\_j}$ in the buffer $\vec{d}$ into a j-th element $c_j$ of an output vector $\vec{c}$.

7. A non-transitory computer readable medium having a program recorded thereon for causing a computer to function as the permutation apparatus according to claim 1 or 2.

* * * * *